United States Patent

[11] 3,591,246

| [72] | Inventor | Thomas F. Adams<br>28334 Ridgebrook Road, Farmington<br>Township, Oakland County, Mich. 48024 |
|---|---|---|
| [21] | Appl. No. | 758,247 |
| [22] | Filed | Sept. 9, 1968 |
| [45] | Patented | July 6, 1971 |

[54] VERTICALLY ADJUSTABLE LOADING DECK FOR TRANSPORT CONTAINERS
28 Claims, 18 Drawing Figs.

| [52] | U.S. Cl. | 312/306 |
|---|---|---|
| [51] | Int. Cl. | A47b 57/06 |
| [50] | Field of Search | 105/371, 368; 296/1 A, 24; 312/306; 108/144 |

[56] References Cited
UNITED STATES PATENTS

| 1,246,467 | 11/1917 | Rember | 105/371 |
| 2,586,857 | 2/1952 | Page | 105/371 |
| 3,405,661 | 10/1968 | Erickson et al. | 105/368 X |
| 3,411,464 | 11/1964 | MacKay | 108/144 X |

*Primary Examiner*—James T. McCall
*Attorney*—Donnelly, Mentag & Harrington

ABSTRACT: A vertically adjustable loading deck for use in closed cargo transport containers such as a truck, a truck trailer, or a railroad car and the like, or in stationary storage containers, and which is adapted to be adjusted to a selected loading position spaced downward from the roof of a closed cargo container and secured in place to provide a second loading platform spaced upwardly from the usual container fixed loading deck, and which is movable in a quick and easy manner by a single operator.

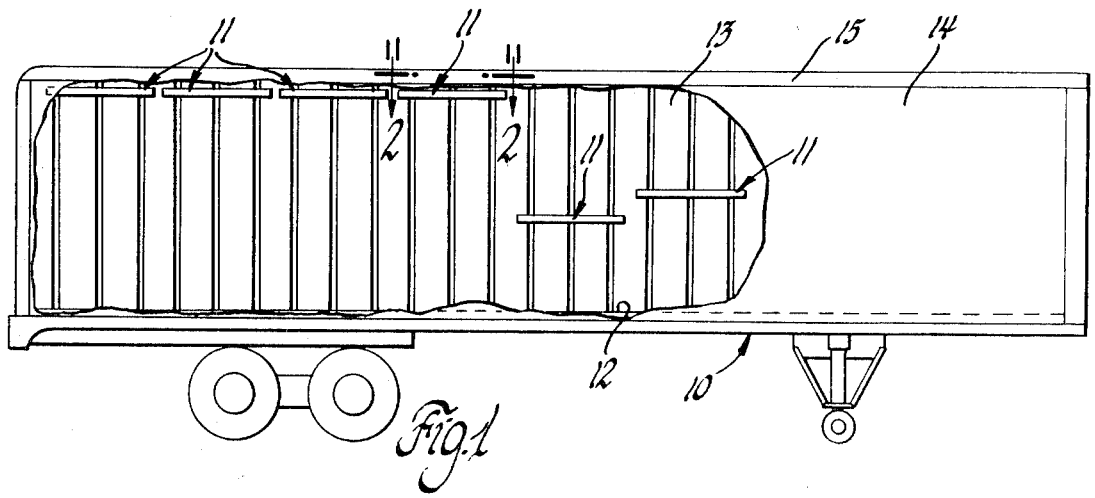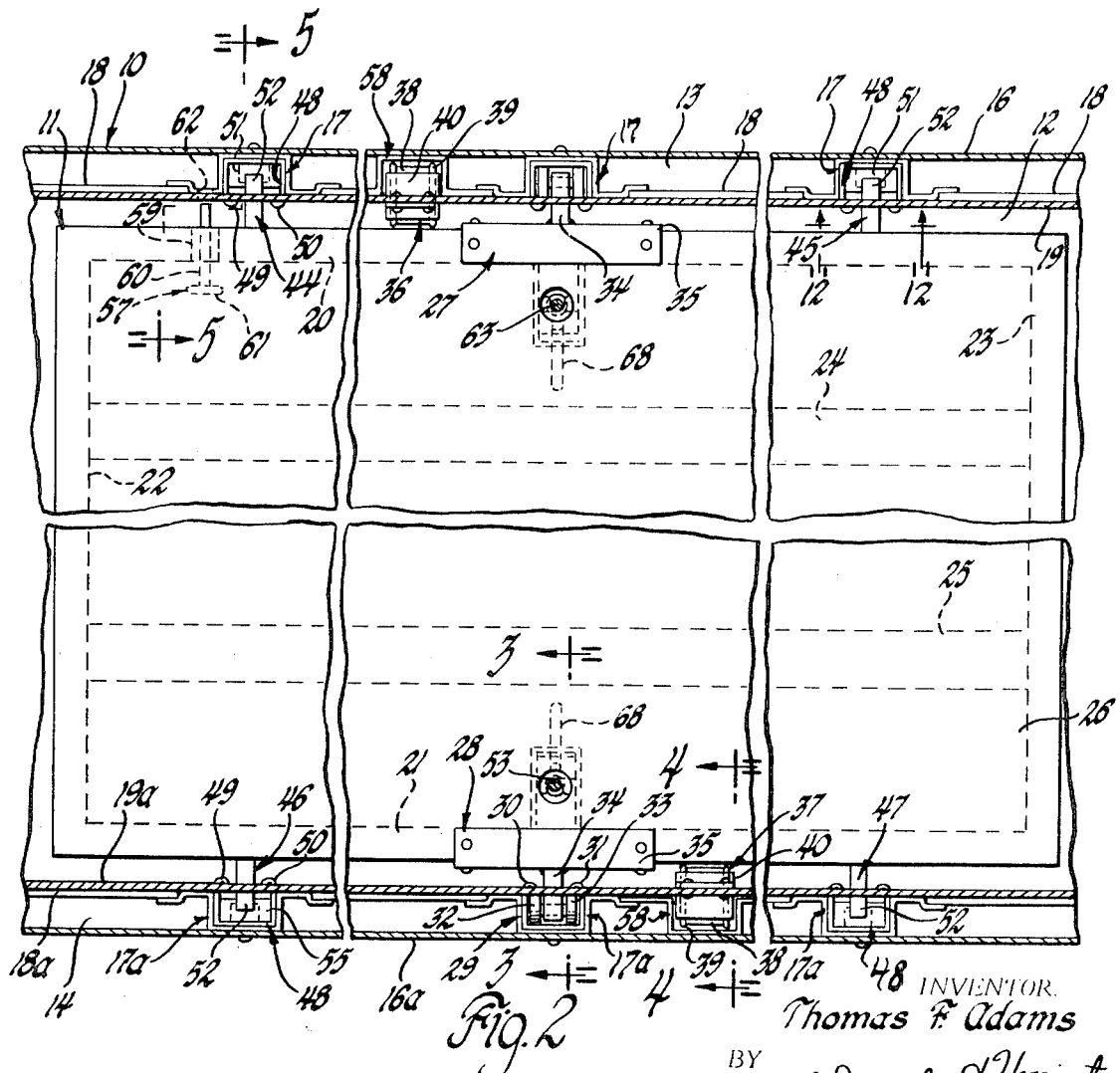

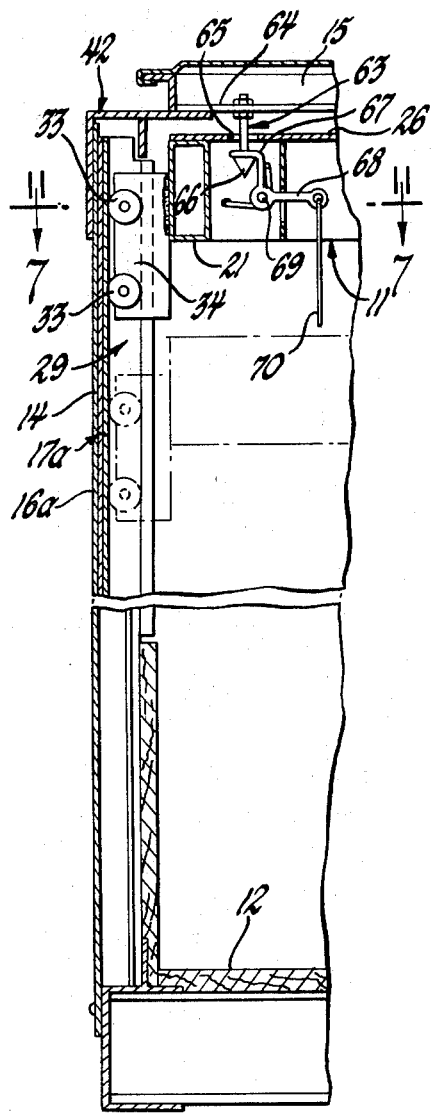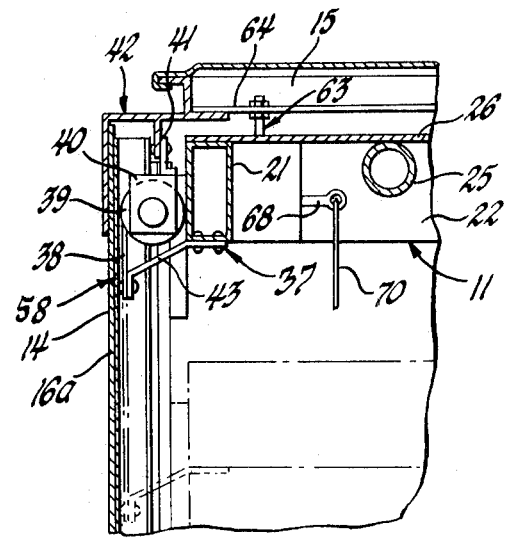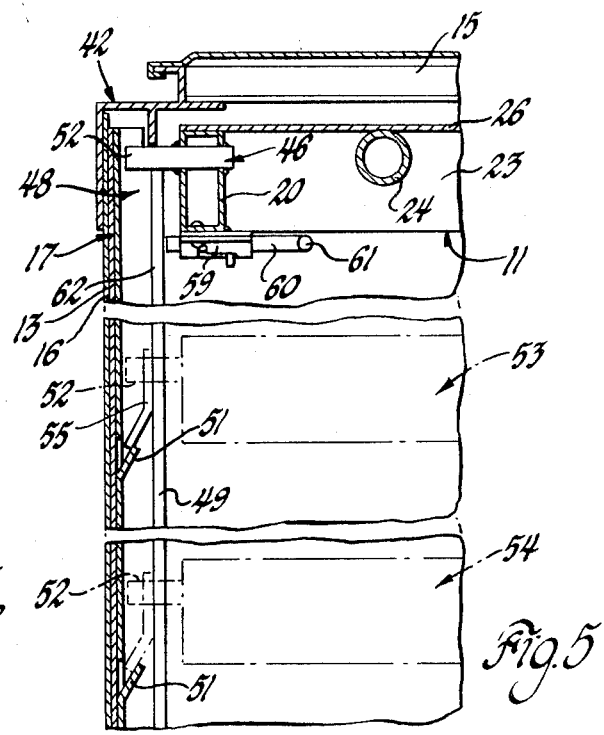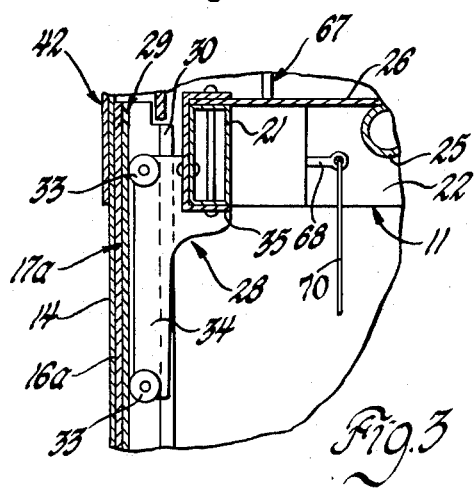

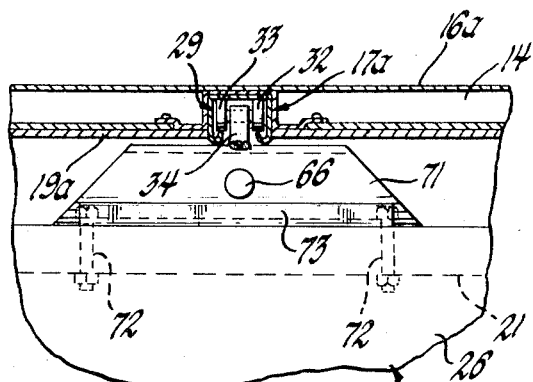
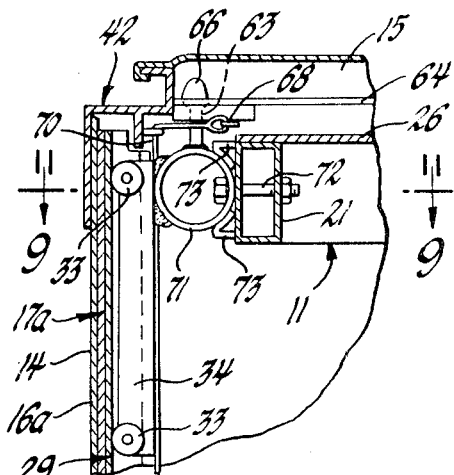
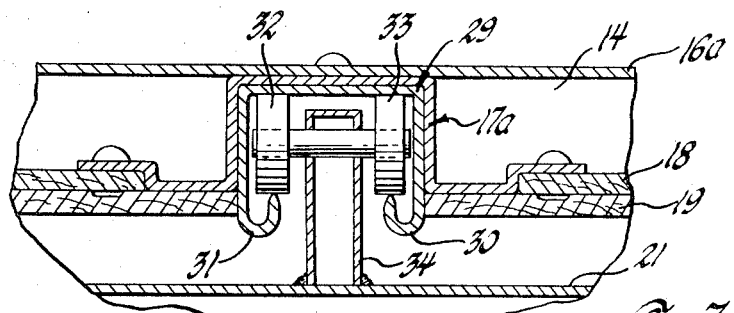
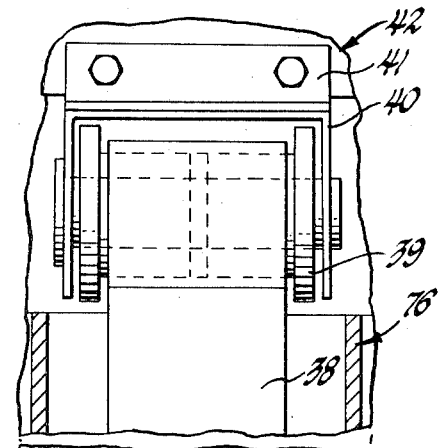
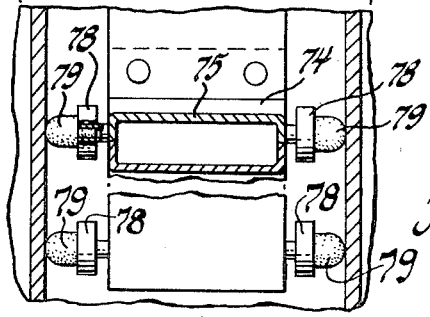

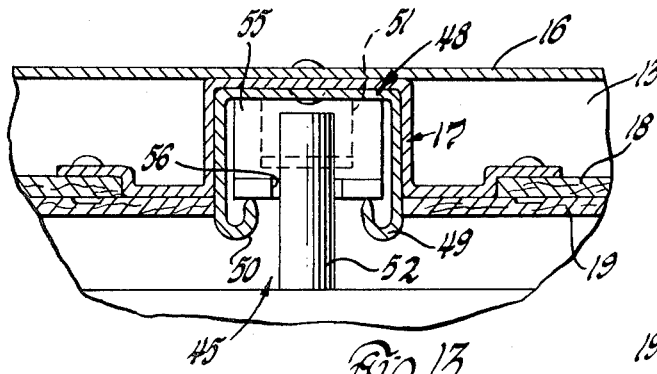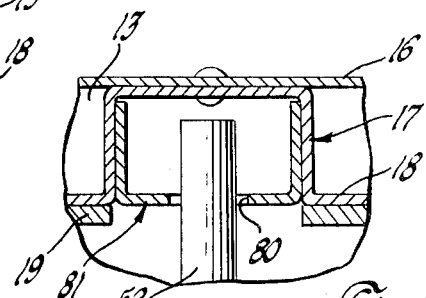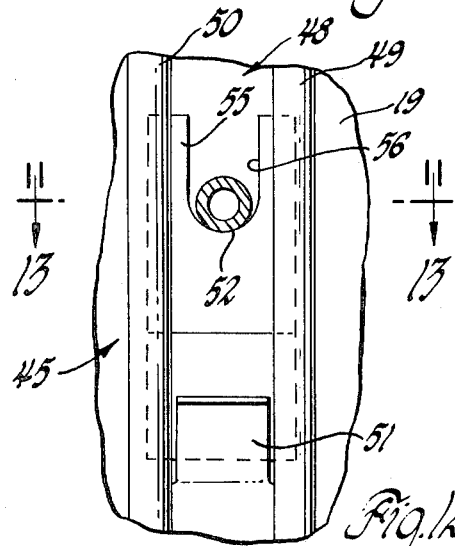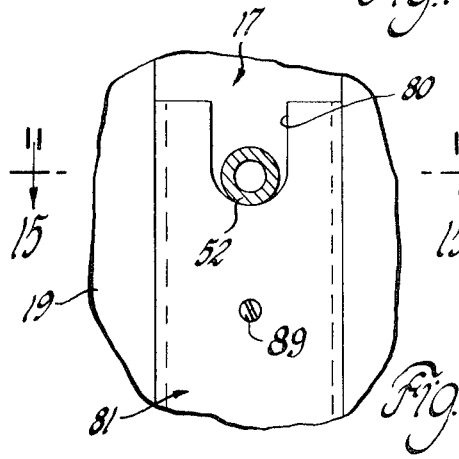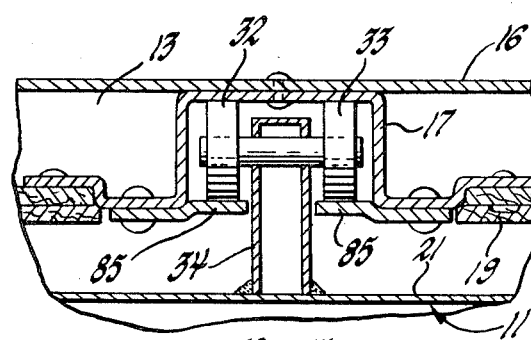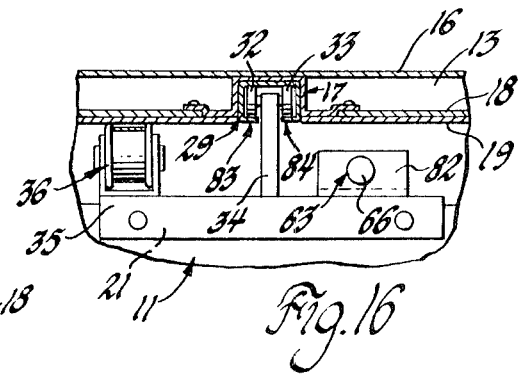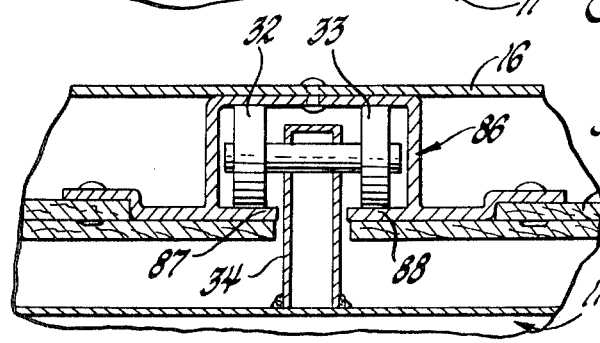

VERTICALLY ADJUSTABLE LOADING DECK FOR TRANSPORT CONTAINERS

SUMMARY OF THE INVENTION

This invention relates generally to containers for cargo transportation and storage, and more particularly, to a vertically adjustable cargo deck which may be quickly and easily disposed at a predetermined vertical height above a fixed cargo deck or platform to increase the useful load capacity of a cargo transport or storage container.

The transportation of cargo has developed into an important industry. The trucking industry employs vans and semitrailers which comprise closed cargo containers that are each provided with a fixed deck that functions as the bottom of the cargo container on which the full weight capacity of the container can be supported. The present type closed cargo containers are constructed with roof rail members and wall supports which also have a capacity for supporting the full weight capacity of the container. For example, many heavy loads of meat are often carried in closed cargo containers by supporting the same from overhead attachment means carried by the roof rail members. In many instances the cargo carried in a closed cargo container is of such a nature that when the cargo is loaded onto the main deck of the container, the entire deck is covered, while neither the weight capacity of the container, nor the cubic capacity, is fully utilized. Heretofore, in order to overcome the disadvantage of the last-mentioned cargo situation, it has been proposed to provide a second loading deck supported approximately one-half way up on the container walls to provide additional loading deck area. One of such systems is to equip the sidewalls of the container with prepunched angle or channel strips which will accept individual snap-in, load-supporting members. Such load-supporting members are then covered with decking material, such as plywood, to form an elevated deck which will double the deck surface capacity of the trailer. In such a second deck arrangement, there are many loose components and this is a disadvantage since it takes considerable time in handling said components to build up and load such a second deck, and to disassemble the same after each use. The last described prior art second deck arrangement has a further disadvantage of having many support members which must be handled several times, and the various deck components are subject to being lost, stolen or left behind by the operator of a semitrailer. When not in use, the second deck components often are difficult to carry and take up usable cargo carrying space. To avoid such cargo space waste, the second deck components can be stored at a home dock terminal, but such action provides a further disadvantage in that the second deck components are not available when it is necessary to make unexpected cargo pickups at remote destinations.

In view of the foregoing, it is an important object of the present invention to provide a novel and improved vertically adjustable loading deck for closed cargo containers which overcomes the aforementioned disadvantages of the prior art second deck constructions.

It is another object of the present invention to provide a novel and improved vertically adjustable loading deck for closed cargo containers which will have no loose or detachable components, which will not decrease the space capacity of a container, and which will store directly below the container roof at a height approximately no lower than the height of the rear door header of the container, and without appreciably decreasing the effective width of the container.

It is still another object of the present invention to provide a vertically adjustable loading deck for a closed cargo container which can be used singly, or in groups in a closed cargo container to divide the longitudinal dimension of the container into a plurality of easy to use adjustable loading decks, and which can be operated by one man using a minimum amount of effort and time.

It is a further object of the present invention to provide a novel and improved vertically adjustable loading deck for cargo containers, and which incorporates an efficient track and roller means that facilitates the upward and downward movements of the deck and prevents bowing of the container sides, and which deck is further provided with a means for counterbalancing the weight of the deck as it is moved upwardly or downwardly, and which is provided with a positive self-latching means for automatically locking the deck in an elevated out-of-the-way storage position.

It is still a further object of the present invention to provide a novel and improved vertically adjustable loading deck for closed cargo containers which may be built into a container at the time of its manufacture, or which can be built into or added onto an existing container.

It is another object of the present invention to provide a novel and improved vertically adjustable loading deck for use in closed cargo containers which are provided with loading deck engagement means or strong side supports at desired incremental locations, and which are constructed and arranged so that they will not become disengaged when supporting a deck and its cargo.

It is a further object of the present invention to provide a novel and improved second deck for a closed cargo container having a roof, a pair of sidewalls and a fixed bottom cargo supporting deck, and which second deck includes a vertically movable deck disposed above the container fixed cargo deck, means for movably supporting the movable deck for movements between a fully raised position adjacent said roof and a selected, adjusted, lowered loading position, means for releasably retaining said movable deck in said fully raised position, means for guiding said movable deck between said fully raised position and a selected loading position, and means for supporting said movable deck in a stationary selected loading position spaced vertically downward from said fully raised position.

It is still another object of the present invention to provide a novel and improved vertically adjustable loading deck for closed cargo containers which can be used singly, or in a double-movable deck arrangement, a triple deck arrangement, and so forth, as desired.

Other features and advantages of this invention will be apparent from the following detailed description, appended claims, and the accompanying drawings.

BRIEF DESCRIPTION OF THE FIGURES IN THE DRAWINGS

FIG. 1 is a side elevational view, with parts broken away, of a semitrailer provided with a plurality of vertically adjustable loading decks made in accordance with the principles of the present invention;

FIG. 2 is a fragmentary, enlarged, broken, horizontal section view of the adjustable deck structure illustrated in FIG. 1, taken along the line 2-2 thereof, and looking in the direction of the arrows;

FIG. 3 is a fragmentary, elevational section view of the adjustable deck structure illustrated in FIG. 2, taken along the line 3-3 thereof, and looking in the direction of the arrows;

FIG. 4 is a fragmentary, elevational section view of the adjustable deck structure illustrated in FIG. 2, taken along the line 4-4 thereof, and looking in the direction of the arrows;

FIG. 5 is a fragmentary, broken, elevational section view of the adjustable deck structure illustrated in FIG. 2, taken along the line 5-5 thereof, and looking in the direction of the arrows;

FIG. 6 is a fragmentary, broken, elevational section view, similar to that of FIG. 3, and showing a modified structure for attaching the guide rollers to the adjustable deck frame;

FIG. 7 is a fragmentary, enlarged, horizontal section view of the modified structure illustrated in FIG. 6, taken along the line 7-7 thereof, and looking in the direction of the arrows;

FIG. 8 is a fragmentary, elevational section view, similar to that of FIG. 3, and showing still another modified structure for attaching the guide rollers to the adjustable deck frame;

FIG. 9 is a fragmentary, horizontal section view of the structure shown in FIG. 8, taken along the line 9–9 thereof, looking in the direction of the arrows and with the view turned 90°;

FIG. 10 is a fragmentary, horizontal section view of a modified guide roller track structure for use in closed cargo containers which have flush interiors;

FIG. 11 is a fragmentary, broken, elevational view of the structure illustrated in FIG. 10, taken along the line 11–11 thereof, and looking in the direction of the arrows;

FIG. 12 is a fragmentary, enlarged, elevational view, partly in section, of the structure illustrated in FIG. 2, taken along the line 12–12 thereof, looking in the direction of the arrows, and showing the adjustable post structure for supporting the adjustable deck;

FIG. 13 is a fragmentary, horizontal section view of the structure illustrated in FIG. 12, taken along the line 13–13 thereof, and looking in the direction of the arrows;

FIG. 14 is a fragmentary, elevational view, similar to FIG. 12, and showing a fixed post structure for supporting the adjustable deck of the present invention in a loading position;

FIG. 15 is a fragmentary, horizontal section view of the structure illustrated in FIG. 14, taken along the line 15–15 thereof, and looking in the direction of the arrows;

FIG. 16 is a fragmentary, horizontal section view, similar to FIG. 7 and showing a further embodiment of the invention wherein the return spring, the guide rollers and self-latching retainer means are all mounted on a single-mounting channel section into which the side of the deck panel is inserted;

FIG. 17 is a fragmentary, horizontal section view, similar to FIG. 7 and showing a further embodiment of the invention wherein the roller track means is fabricated from a plurality of parts; and, FIG. 18 is a fragmentary, horizontal section view similar to FIG. 7, and showing a still further embodiment of the invention wherein the roller track means and wall post comprise a special extrusion.

PARTICULAR DESCRIPTION OF THE INVENTION

Referring now to the drawings, and in particular to FIG. 1, the numeral 10 generally designates a closed cargo container in the form of a truck semitrailer which is provided with a plurality of vertically adjustable loading decks, generally indicated by the numeral 11, and which are made in accordance with the principles of the present invention. Although the invention is described hereinafter in connection with the truck semitrailer 10, it will be understood that the adjustable loading deck of the present invention may be utilized in connection with any type of cargo container such as a truck, truck trailer, or railroad car, or with any stationary storage space or container. The cargo or storage material which may be disposed on the vertically adjustable loading deck 11 of the present invention may be of any type of dry freight, as well as other types of freight, such as livestock.

As shown in FIGS. 1 and 2, the semitrailer 10 is provided with the usual fixed loading deck 12 which is enclosed by the sidewalls 13 and 14, and the roof 15. The sidewalls 13 and 14 are constructed similarly. Sidewall 13 will be described and the same reference numerals will be applied to the structure of sidewall 14, followed by the small letter a.

As shown in FIG. 2, the sidewall 13 includes the outer strength panel 16 which is secured to a plurality of vertical, spaced apart, U-shaped channel wall supports or posts 17. The lower ends of the channel wall supports 17 are secured to the supporting structure of the fixed deck 12 in a conventional manner. The sidewall 13 further includes the inner wall panel 18 which comprises a plurality of panels fitted in between the posts 17. A continuous inner wall panel 19 may be attached over the inner wall panel and the posts 17, if desired. It will be understood that the inner wall panel 18 could be deleted, and only the inner wall panel 19 used, if desired. The panel 16 is secured to the vertical U-shaped channels 17 by any suitable means, as by riveting or welding. The construction of the sidewall 13 is conventional. The wall panel 16 is normally made from any suitable metal for strength purposes while the inner wall lining panel 19 is normally made from a replaceable material such as plywood and the like.

As shown in FIG. 2, the vertically movable deck 11 includes a frame comprising a pair of longitudinal side frame members 20 and 21 which are fixedly connected to a pair of end frame members 22 and 23, by any suitable means, as by welding. The frame members 20 through 23 have rectangular tubular configurations. The frame end members 22 and 23 are interconnected by the spaced, fixed, longitudinal, circular pipes or tubes 24 and 25. It will be understood that the deck frame members 20 through 23 may be made from any suitable material and have any suitable cross-sectional configuration. A suitable lightweight material may be used, as wood, aluminum or magnesium. As illustrated in FIG. 2, the frame comprising the deck 11 is covered by a load receiving surface 26 which may be made from any suitable material, as for example stressed skin plywood panel. The panel 26 is connected to the deck frame by any suitable means.

As best seen in FIG. 2, the vertically movable deck 11 is provided with a guide means 27 on the one side of the deck and a guide means 28 on the other side of the deck. The guide means 27 and 28 are situated on the same transverse centerline which is equidistant from the ends of the deck. The guide means 28 is described hereafter, and the same reference numerals are applied to the guide means 27. The guide means 28 comprises a vertically disposed U-shaped channel 29 which is fixed in one of the sidewall support channels 17a. The outer edges of the flanges of the channel 29 are folded inwardly and backwardly toward the bight portion of the channel to form the round faced track portions 30 and 31 which may also be formed as flat lips, if desired. A guide roller bracket 34 extends into the channel 29 and carries an upper pair of rollers 32 and 33 and a lower pair of rollers 32 and 33 which are rollably mounted in the track formed by the bight portion of the channel 29 and the channel flange inturned ends 30 and 31. As shown in FIGS. 2 and 3, the upper end of the roller carrier bracket 34 is fixed, as by welding, to a horizontal channel member 35 which is secured to the top and bottom of the deck side frame member 21 by any suitable means, as by riveting.

As shown in FIG. 2, the movable deck 11 is provided with means for movably supporting the movable deck for movements between a fully raised position and a lowered loading position by a pair of counterbalancing springs generally indicated by the numerals 36 and 37. The spring 37 will be described in detail and the spring 36 will be marked with the same reference numerals. As shown in FIG. 2, the springs 36 and 37 are disposed on opposite sides of the deck 11 and on opposite sides of the transverse centerline of the deck.

As best seen in FIG. 4, the counterbalancing spring 37 includes the flat strip or ribbonlike spring 38 which has its upper end coiled on the reel 39. The reel 39 is carried in a housing 40 that is fixed to a plate 41 which is in turn secured to a trailer roofing corner angle member generally indicated by the numeral 42. The lower end of the spring 38 is secured to the sidewardly, outward extended arm 43 which has its inner end secured to the deck side frame member 21. The spring housing 40 and the outer end of the arm 43 are disposed so that the spring 38 is recessed between two of the sidewall channels 17a and in a protective housing 58 inserted between two channels 17a. Although a spring has been shown as a means for counterbalancing the weight of the deck 11 as it is moved up and down, it will be understood that other suitable counterbalancing means may be used, as for example, a weight, lever, pressure or cable arrangement.

As shown in FIG. 2, the movable deck 11 is provided with means for supporting the deck in a stationary loading position spaced vertically downwardly from the fully raised position, and which includes a pair of supporting means 44 and 45 on one side of the deck 11 and a similar pair of supporting means 46 and 47 on the other side of the deck. The support means 44 and 46 are disposed in transverse alignment at one end of the deck and the support means 45 and 47 are disposed at the other end of the deck 11 in transverse alignment. All of the support means 44 through 47 are constructed similarly, and the support means 44 will be described in detail and the other support means marked with the same reference numerals.

As shown in FIG. 2, the support means 44 includes a vertical U-shaped channel, generally indicated by the numeral 48, which is fixedly mounted in one of the sidewall channels 17. The outer ends of the flanges of the channel 48 are turned inwardly and then backwardly to form two vertical round surfaced support members 49 and 50, which could be formed with flat surfaces, if desired. As shown in FIG. 5, a plurality of tabs 51 are struck from the bight portion of the channel 48, and these tabs angle inwardly toward the deck 11. The support means 44 further includes a load bracket comprising horizontal tubular shaft 52, which could be solid, and which is fixed to the deck side frame 20, and which has its outer end extended into the channel 48. As shown by the solid line position of the deck 11 in FIG. 5, the deck 11 is in the fully raised position adjacent the roof 15. The numerals 53 and 54 designate selected lowered loading positions to which the deck 11 may be moved. The deck 11 is supported in the positions 53 and 54 by a shoe or post 55 which has its upper end provided with a U-shaped recess for receiving the outer end of the shaft 52. The lower end of the post 55 in angled sidewardly outwardly so as to engage one of the tabs 51 in the selected lowered position. The support means 45 is illustrated in detail in FIGS. 12 and 13. As shown in FIGS. 12 and 13, the upper end of each of the posts 55 is provided with a U-shaped recess 56 for reception of a shaft 52. It will be understood that all four of the shafts 52 function simultaneously to support a deck 11 in an adjusted position.

As shown in FIGS. 2 and 5 the deck 11 is provided with means for releasably locking the deck in a selected lowered position, and which means comprises a slide bolt 57. Slide bolt 57 is mounted on one side of the deck 11 at one end thereof.

As shown in FIG. 2, the slide bolt 57 includes a bolt body 60 which is slidably mounted in a support bracket 59 which is fixed to the lower side of the side frame 20, but it will be understood that the support bracket 59 may be secured to the end frame member 22, if desired. The bolt body 60 is provided with a suitable head 61 for manual operation. The bolt 57 may be moved from the inoperative position shown in FIG. 2 into a suitable hole, as 62, formed through the sidewalls 18 and 19 and the flange of one of the posts 17, for securing the deck 11 in a lowered position against the upward pull of the counterbalance spring force.

FIG. 6 shows a slight modification of the structure for mounting the guide rollers on the side of the deck 11. In this modified structure the roller carrier bracket 34 is welded directly to the side of the deck frame 21.

FIG. 6 also illustrates a means for releasably retaining the movable deck 11 in the fully raised position. Said last-mentioned means comprises a self-latching means which includes a male latch member 63 which is secured to a roof crossmembers 64, by any suitable means. The male latch member 63 extends downwardly through the hole 65 formed through the deck surface panel 26. The male latch member 63 is provided with the enlarged head 66 which is adapted to be releasably engaged by a female latch member 67. The female latch member 67 is carried on a crank 68 which is pivoted at the point 69 on the deck 11. A rope 70 or the like is attached to the end of the crank 68 for pulling down on the crank 68 to pivot the same to release the female latch member 67 from the male latch member 63 to permit the deck 11 to be moved downwardly.

FIGS. 8 and 9 illustrate a modified movable deck structure in which the guide rollers 32 and 33 are secured to the deck 11 by a slightly modified structure. The roller carrier bracket 34 is shown as being welded to a longitudinally extended tubular member 71 which is secured by a pair of bolts 72 to the deck side frame member 21. A pair of castings 73 are mounted between the deck side frame member 21 and the tubular member 71 for seating the tubular member 71 against the frame member 21. As shown in FIG. 8, the male-latching member 63 is carried by the tubular member 71, and the female latch member 67 is secured to the roof member 64. The rope 70 for releasing the female latch member 67 is extended toward the side of the van for operating the latching means along the sidewall 14 of the van. It will be understood that both sides of the deck 11 would be provided with the roller means shown in FIGS. 8 and 9 if this modified structure is adapted.

FIGS. 10 and 11 illustrate another embodiment wherein the counterbalancing spring is attached to the guide roller means which in turn is mounted in an extruded or formed channel. The construction of FIGS. 10 and 11 is especially adapted for cargo containers with flush walls and which are not provided with wall supports in the form of channels. This construction is more adaptable for mounting in cargo containers which are in the field.

As shown in FIG. 11 the counterbalancing spring reel housing 40 will be secured by the strap 41 to the roof overhead member 42 in the same manner as described hereinbefore for the structure of FIG. 4. The spring 38 is connected at its lower end to a guide roller housing 74 which is fixed by means of the mounting arm 75 to the deck side frame member 21. The guide roller housing 74 is mounted within an extruded channel 76 which is secured to the van sidewall 16a by any suitable means as by rivets. The roller housing 74 is provided with a pair of shafts 77 on each of which is mounted a pair of guide rollers 78 and a pair of sliders 79. It will be seen that the sliders 79 provide end thrust guiding action for the deck 11, whereas the rollers 78 provide sideward thrust guiding action in the channel 76. Load post arrangements, as in FIGS. 13 or 15, would provide the load support means for the deck 11.

FIGS. 14 and 15 illustrate a modified post arrangement for supporting the movable deck 11 in a stationary loading position. In the embodiment of FIGS. 14 and 15, the support shafts 52 on the sides of the deck 11 nest in a U-shaped recess 80 formed in the upper end of a U-shaped channel post 81 to resist acceleration and deceleration forces of the cargo carried on the deck 11. The post 81 is made to the desired height that the deck 11 is to be supported above the fixed deck 12. As shown in FIG. 15 the fixed length post 81 is slidably mounted in one of the wall support channels 17 and releasably secured in place by any suitable means, as by the screw 89. It will be understood that all of the support shafts 52 would be supported in the same manner in the modified structure of FIGS. 14 and 15.

FIG. 16 illustrates a modification of the previously described structure of FIGS. 2 and 3 wherein the guide roller carrier bracket 34 is secured to the channel member 35 which is in turn secured to the deck side frame 21. However, in the embodiment of FIG. 16, the counterbalancing spring reel is secured to the outer side of the channel member 35 and the male-latching member 63 is also secured to the channel member 35 so that the latching apparatus functions in the same manner as the latching apparatus illustrated in FIG. 6. The male-latching member 63 is shown as being carried by the plate 82 which is secured to the channel member 35. It will be understood that the spring means 37 on the other side of the deck 11 would also be mounted in a similar manner. FIG. 16 also shows a modified U-shaped channel 29 in which the flanges 83 and 84 are formed flat to form a track for the rollers 32 and 33.

FIG. 17 illustrates a further modified guide roller structure wherein the track for the guide rollers 32 and 33 is formed by providing vertically extended flanges 85 over the outer edges of a wall support channel 17 to form a track for the rollers 32 and 33.

FIG. 18 illustrates a still further modified guide roller structure wherein a track for the guide rollers 32 and 33 is formed by providing a wall support in the form of a U-shaped channel 86 which can be formed as an extruded section. The channel 86 is provided with the integral flanges 87 and 88 which coact with the bight portion of the channel to form a track for the rollers 32 and 33. Similar combined roller track and post arrangements could be likewise patterned where side ports of other designs and configurations are employed. The U-shaped channel 86 may be used for original equipment installation. The U-shaped channel 86 could similarly be used as in FIG. 13 to combine U-shaped channel 48 with U-shaped post 17.

It will be understood that the decks 11 would be in their fully raised positions when not in use, as shown by the solid line positions of the three decks 11 in the rear end of the van of FIG. 1. The decks 11 can be moved to one of the two lowered loading positions shown by the two decks 11 disposed toward the front of the van 10 in FIG. 1 by the following procedure. Before lowering the deck 11, the operator selects the desired level to which he wishes to lower the deck and he then adjusts all four support posts 55 to the appropriate tabs 51. Next, he pulls down on the latch-releasing rope 70, and by a continued downward pull, the deck 11 will move downwardly to the desired level and rest on the support posts 55. At the desired level, the slide bolt 57 is moved into locking position to counteract the upward pull of the counterbalancing springs. The support posts 55 are always in their various channels at their last selected height and do not have to be removed for storage purposes when the decks 11 are in the raised positions. In order to move the decks 11 from a lowered position to a raised position, the slide bolt 57 is merely moved to its released position and the deck 11 is pushed upwardly. When the deck 11 reaches the fully raised position, the self-latching means operates to retain the deck in the fully raised position. It will be seen that the vertically movable deck 11 of the present invention provides a second deck, or a plurality of stacked decks, as desired, for a closed cargo container which is simple and compact in construction, and efficient in operation. It will be understood that although a plurality of the deck units 11 may be used in a semitrailer or the like, that one or more of the units can be used with the remaining decks being disposed in the raised storage position. Each of the decks 11 can be lowered and locked in position, and loaded at the desired selected height, depending on the height of the cargo stored on the fixed deck 12 underneath the deck 11. All of the decks 11 in a van can be loaded at the same height or at different heights.

While it will be apparent that the preferred embodiments of the invention herein disclosed are well calculated to fulfill the objects above stated, it will be appreciated that the invention is susceptible to modification, variation and change.

What I claim is:

1. In a closed cargo container having a roof, a pair of sidewalls and a fixed bottom cargo-supporting deck, the combination comprising:
 a. a vertically movable rectangular deck disposed above said fixed deck;
 b. means disposed outboard on each side of said deck and longitudinally from the ends of the deck for movably supporting said movable deck for movements between a fully raised position adjacent said roof and a selected, adjusted, lowered loading position;
 c. means for releasably retaining said movable deck against movement in said fully raised position;
 d. means for guiding said movable deck vertically between said fully raised position and a selected loading position and for restraining side movement of the movable deck; and
 e. means for supporting said movable deck in a stationary selected loading position spaced vertically downward from said fully raised position.
2. The structure defined in claim 1, including:
 a. means for releasably locking the vertically movable deck in a selected lowered loading position.
3. The structure as defined in claim 1, wherein:
 a. said means for movably supporting said movable deck between the said fully raised position and a selected lowered loading position comprises a spring means.
4. The structure as defined in claim 3, wherein:
 a. said spring means comprises at least one counterbalancing spring on each side of said movable deck.
5. The structure as defined in claim 4, wherein each of said counterbalancing springs comprises:
 a. a fixed spring housing disposed in an operative position adjacent said fully raised position; and,
 b. a strip spring having one end connected to said movable deck and the other end mounted on a retracting reel in said spring housing.
6. The structure as defined in claim 4, wherein:
 a. the counterbalancing spring on one side of the movable deck is on one side of the transverse central axis and the other counterbalancing spring on the other side of said movable deck is on the other side of said transverse central axis.
7. The structure as defined in claim 5, wherein:
 a. each of the strip springs is recessed in a track on the adjacent container sidewall.
8. The structure as defined in claim 4, wherein each of said counterbalancing springs comprises:
 a. a spring retracting wheel attached to the side of said movable deck; and,
 b. a strip spring having one end operatively attached to said spring retracting reel and the other end fixed at a position above said fully raised position.
9. The structure as defined in claim 8, wherein:
 a. each of said strip springs is recessed in a track on the adjacent container sidewall.
10. The structure as defined in claim 9, wherein:
 a. said means for guiding said movable deck between said fully raised position and a selected loading position comprises a plurality of guide members attached to said movable deck for guiding engagement with the inner surfaces of said track.
11. In a closed container having a roof, a pair of sidewalls and a fixed bottom cargo-supporting deck, the combination comprising:
 a. a vertically movable deck disposed above said fixed deck;
 b. means for movably supporting said movable deck for movements between a fully raised position adjacent said roof and a selected, adjusted, lowered loading position;
 c. means for releasably retaining said movable deck in said fully raised position;
 d. means for guiding said movable deck between said fully raised position and a selected loading position;
 e. means for supporting said movable deck in a stationary selected loading position spaced vertically downward from said fully raised position;
 f. said means for movably supporting said movable deck between the said fully raised position and a selected lowered loading position comprising a spring means;
 g. said spring means comprising at least one counterbalancing spring on each side of said movable deck;
 h. each of said counterbalancing springs comprising,
  1. a spring retracting reel attached to the side of said movable deck; and,
  2. a strip spring having one end operatively attached to said spring retracting reel and the other end fixed at a position above said fully raised position;
 i. each of said strip springs being recessed in a track on the adjacent container wall;
 j. said means for guiding said movable deck between said fully raised position and a selected loading position comprising a plurality of guide members attached to said movable deck for guiding engagement with the inner surfaces of said track; and,
 k. said guide members comprising,
  1. a pair of guide rollers; and,
  2. a pair of slide elements.
12. The structure as defined in claim 11, wherein, a. said track comprises an extruded channel attached to the adjacent container sidewall.

13. The structure as defined in claim 2, wherein said means for releasably locking the movable deck in a selected lowered loading position comprises:
   a. a slide bolt mounted on said movable deck and engageable with a slide bolt hole in the adjacent container sidewall.

14. The structure as defined in claim 1, wherein said means for releasably retaining said movable deck in said fully raised position comprises:
   a. a self-latching means.

15. The structure as defined in claim 14, wherein said self-latching means comprises:
   a. a male-latching member fixed on the cargo container; and,
   b. a female-latching member fixed on the movable deck and adapted to releasably latch onto said male-latching member when the movable deck is moved to the fully raised position.

16. The structure as defined in claim 14, wherein said self-latching means comprises:
   a. a female-latching member fixed on the cargo container; and,
   b. a male-latching member fixed on the movable deck, and said female-latching member being adapted to releasably latch onto said male-latching member when the movable deck is moved to a fully raised position.

17. The structure as defined in claim 1, wherein said means for guiding said movable deck between said fully raised position and a selected loading position comprises:
   a. a plurality of guide rollers operatively mounted on each side of said movable deck and in rolling engagement with the adjacent cargo container sidewall.

18. In a closed cargo container having a roof, a pair of sidewalls and a fixed bottom cargo-supporting deck, the combination comprising:
   a. a vertically movable deck disposed above said fixed deck;
   b. means for movably supporting said movable deck for movements between a fully raised position adjacent said roof and a selected, adjusted, lowered loading position;
   c. means for releasably retaining said movable deck in said fully raised position;
   d. means for guiding said movable deck between said fully raised position and a selected loading position;
   e. means for supporting said movable deck in a stationary selected loading position spaced vertically downward from said fully raised position;
   f. said means for guiding said movable deck between said fully raised position and a selected loading position comprising a plurality of guide rollers operatively mounted on each side of said movable deck and in rolling engagement with the adjacent cargo container sidewall; and,
   g. the plurality of guide rollers on each side of said movable deck being rotatably mounted on a carrier bracket that is welded to the movable deck.

19. In a closed cargo container having a roof, a pair of sidewalls and a fixed bottom cargo-supporting deck, the combination comprising:
   a. a vertically movable deck disposed above said fixed deck;
   b. means for movably supporting said movable deck for movements between a fully raised position adjacent said roof and a selected, adjusted, lowered loading position;
   c. means for releasably retaining said movable deck in said fully raised position;
   d. means for guiding said movable deck between said fully raised position and a selected loading position;
   e. means for supporting said movable deck in a stationary selected loading position spaced vertically downward from said fully raised position;
   f. said means for guiding said movable deck between said fully raised position and a selected loading position comprising a plurality of guide rollers operatively mounted on each side of said movable deck and in rolling engagement with the adjacent cargo container sidewall; and,
   g. the plurality of guide rollers on each side of said movable deck being rotatably mounted on a carrier bracket that is riveted to the movable deck.

20. In a closed cargo container having a roof, a pair of sidewalls and a fixed bottom cargo-supporting deck, the combination comprising:
   a. a vertically movable deck disposed above said fixed deck;
   b. means for movably supporting said movable deck for movements between a fully raised position adjacent said roof and a selected, adjusted, lowered loading position;
   c. means for releasably retaining said movable deck in said fully raised position;
   d. means for guiding said movable deck between said fully raised position and a selected loading position;
   e. means for supporting said movable deck in a stationary selected loading position spaced vertically downward from said fully raised position;
   f. said means for guiding said movable deck between said fully raised position and a selected loading position comprising a plurality of guide rollers operatively mounted on each side of said movable deck and in rolling engagement with the adjacent cargo container sidewall;
   g. the plurality of guide rollers on each side of said movable deck being rotatably mounted on a carrier bracket that is fixed to the movable deck;
   h. said means for movably supporting said movable deck comprising a counterbalancing spring having,
      1. a fixed housing mounted on said carrier bracket, and
      2. a strip spring having an upper end fixed to the cargo container and the lower end mounted on a retracting reel in said spring housing; and,
   i. said means for releasably retaining said movable deck in said fully raised position comprising a releasable female-latching member attached to the cargo container and a male-latching member mounted on said carrier bracket.

21. The structure as defined in claim 17, wherein:
   a. the plurality of guide rollers on each side of said movable deck are rollably mounted in a guide track on the adjacent cargo container sidewall.

22. The structure as defined in claim 21, wherein said guide track comprises:
   a. a separately formed channel secured to the adjacent cargo container sidewall.

23. The structure as defined in claim 21, wherein said guide track comprises:
   a. a separately formed channel having a bight portion secured to the adjacent cargo container sidewall; and,
   b. a pair of side flanges having the inner ends integral with the bight portion and the outer ends folded inwardly to form a guide track with the bight portion.

24. The structure as defined in claim 21, wherein said guide track comprises:
   a. a channel formed in the adjacent cargo container sidewall and including an outwardly disposed vertical bight portion and a pair of integral side flanges extending perpendicularly inward of the container; and,
   b. a pair of separate vertical flanges secured to the container sidewall in positions parallel to said channel bight portion and extending inwardly of said channel side flanges to form a guide track with the channel bight portion.

25. The structure as defined in claim 21, wherein said guide track comprises:
   a. a channel formed in the adjacent cargo container sidewall and including an outwardly disposed vertical bight portion and a pair of integral side flanges extending perpendicularly inward of the container; and,
   b. a pair of vertical flanges integrally formed along the inner edges of said flanges and in positions parallel to said channel bight portion and extending inwardly of said channel side flanges to form a guide track with the channel bight portion.

26. The structure as defined in claim 1, wherein said means for supporting said movable deck in a stationary selected loading position comprises:

a. a load bracket on each side of said movable deck extended sidewardly outward of the deck; and,
b. a stop means on each of the adjacent cargo container sidewalls for engagement with one of said load brackets for limiting downward movement of the movable deck and to provide stationary support for the movable deck.

27. The structure as defined in claim 26, wherein each of said stop means comprises:
a. a post of predetermined height mounted in a recess on the adjacent cargo container sidewall.

28. The structure as defined in claim 26, wherein each of said stop means comprises:
a. a plurality of vertical spaced apart stop tabs mounted on the adjacent cargo container wall; and,
b. an adjustable post adapted to be selectively mounted on one of said stop tabs and to be engaged by one of said load brackets for limiting downward movement of the movable deck.

PO-1050
(5/69)

UNITED STATES PATENT OFFICE
CERTIFICATE OF CORRECTION

Patent No. 3,591,246                 Dated July 6, 1971

Inventor(s)    THOMAS F. ADAMS

It is certified that error appears in the above-identified patent and that said Letters Patent are hereby corrected as shown below:

Column 5, line 29, "in" should be --is--. Column 5, line 60, "crossmem-" and beginning of line 61, "bers" should be --cross member--. Column 7, line 6, "ports" should be --posts--. Column 8, line 40, following "closed" insert --cargo--. Column 8, line 66, following "container" insert --side--. Column 10, line 69, following "said" insert --side--.

Signed and sealed this 28th day of December 1971.

(SEAL)
Attest:

EDWARD M. FLETCHER, JR.          ROBERT GOTTSCHALK
Attesting Officer                Acting Commissioner of Patents